H. BARSALOU.
Seeding-Machine.
No. 200,163. Patented Feb. 12, 1878.
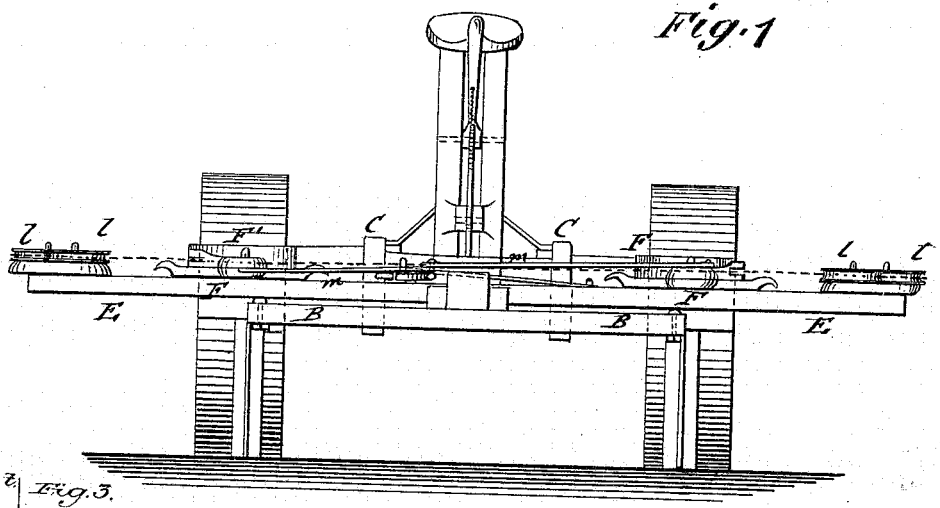
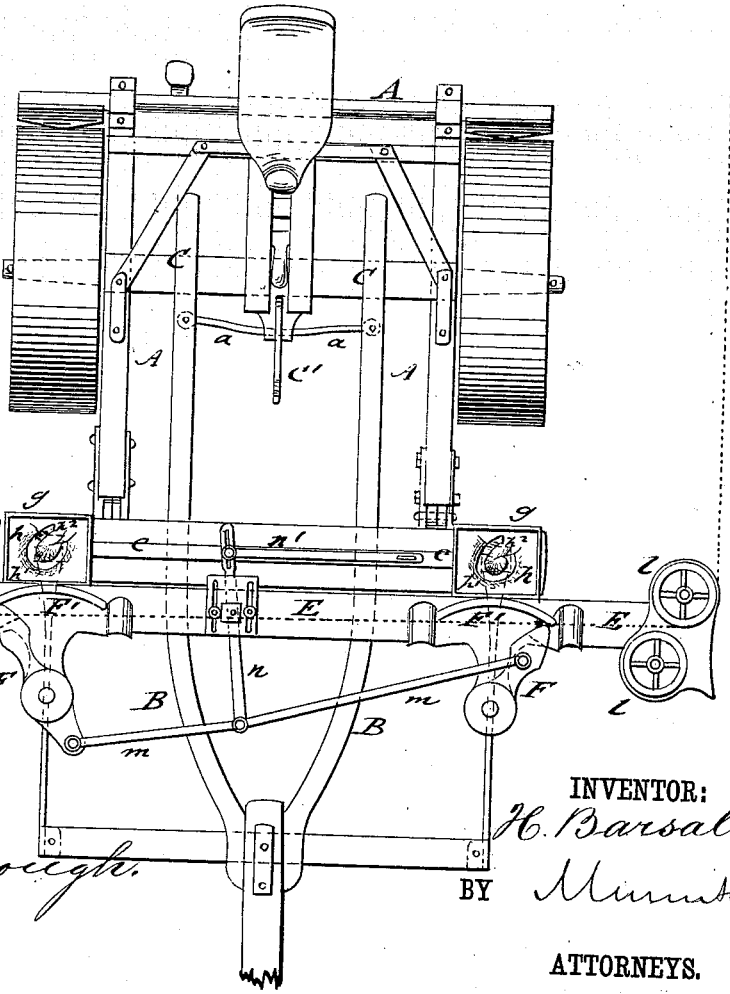
WITNESSES:
C. Neveux
J. H. Scarborough
INVENTOR:
H. Barsalou
BY Munn & Co.
ATTORNEYS.

UNITED STATES PATENT OFFICE.

HENRY BARSALOU, OF ST. ANNE, ILLINOIS.

IMPROVEMENT IN SEEDING-MACHINES.

Specification forming part of Letters Patent No. 200,163, dated February 12, 1878; application filed August 3, 1877.

*To all whom it may concern:*

Be it known that I, HENRY BARSALOU, of St. Anne, in the county of Kankakee and State of Illinois, have invented a new and Improved Seeding-Machine; and I do hereby declare that the following is a full, clear, and exact description of the same.

The present invention relates to improvements in check-row corn-planters; and it consists in the construction and combination of parts, hereinafter explained, and then pointed out in the claims.

In the accompanying drawings, Figure 1 is a front elevation of a planter embodying my improvements. Fig. 2 is a plan or top view of the same. Figs. 3 and 4 are detail vertical longitudinal and transverse sections of the seed-dropping mechanism.

By referring to the drawing, A represents the axle-frame of my seeding-machine, which is hinged to the runner-frame B, placed in front of the same. The driver's seat is arranged on the axle-frame, and axle-frame and runner-frame connected by rear-extending arms C of the hounds of the runner-frame, and by a notched and fulcrumed bar, C', of the axle-frame, the bar C' being operated by a hand-lever from the driver's seat, and acted upon by a suitable spring to secure the connection of the notched bar C' with the cross-rod $a$ of the rear arms C. The notched bar C' retains the runners either in lowered or raised position, according as the cross-rod $a$ is placed in the lower or upper notch, the hand-lever admitting the ready raising of the runner-frame whenever it is desired to interrupt the seeding in turning or for other reasons. The runner-frame B supports the seed-dropping mechanism, which is arranged above the rear ends of the runners, and operated by the mechanism hereinafter described.

The seed-dropping mechanism consists of a seed-hopper, $g$, of suitable size, at each end of the runner-frame, the seed-hoppers supplying the seed to a number of holes of toothed disks $g'$, that are turned by diametrically-opposite parts of loops at the ends of the slide-bar $e$. The notches between the teeth of the seed-disk admit the dropping of the seed at each stroke of the slide-bar, as a hole full of seed is brought over the discharge-opening leading into the seed tube or duct of the runner. The seed is supplied to the holes of the toothed disk by means of a conductor-plate, $h$, that is placed above the disk and fitted to the seed-hopper. The conductor-plate $h$ has a slot, $h^1$, of the same diameter as the holes of the disk from the center, and an inclined channel, $h^2$, that conducts the seed to the slot $h^1$. The tapering edges of the conductor at both sides of the slot serve to cut up and divide lumps of seed when planting cotton, so as to keep up a regular supply, and prevent choking of the seed-holes of the disk.

The conductor-plate forms an essential feature of the seed-dropping mechanism, as the supply of the seed-holes is made more reliable, and the regular motion of the disk secured by the same. The seed tubes or ducts are provided with oscillating tongues $i$, which have outer face-plates $i'$, that conduct the seed, the face-plates following the motion of the tongues.

A lever mechanism carried by the transverse beam E, attached to the runner-frame, serves to operate the seed-dropping devices. The piece E carries at the outer ends double wheels $l$ $l$, for conducting the check-cord and keeping the same always ready for work. The check-cord is stretched across the field in the usual manner, and passed around one wheel or pulley across the supporting-piece E to the wheel at the other end, and then around the same. The check-cord is provided with adjustable balls or knots at suitable distances, which engage the ends of fulcrumed arms F of piece E, the check-cord being guided in the slotted ends of the same. The arms F swing along arc-shaped guard-flanges F', that retain the balls on the slotted ends of the arms, and secure the swinging of the arms by the action of the knots of the cord until the points of the arms are clear of the flanges and allow the knots to pass on. The arms F are connected by pivot-rods $m$ to the end of a fulcrumed lever, $n$, one rod, $m$, being applied to the arm F in front of its fulcrum, the other rod to a point between the fulcrum and the slotted point. This produces the joint swinging of the guide-arms, but in opposite directions, so that, as each is operated by a knot of the check-cord, the other is carried along the guard-flange to the end of the same, ready to receive the next knot. The motion of the arms F is caused by the passage of the check-cord during the forward motion of the planter, and transmitted by the fulcrumed lever $n$ and a lever-rod, $n'$, to the slide-bar $e$ and the seed-dropping mechanism, so as to produce the alternate dropping of the seed in the rows.

The double wheels admit the convenient turning of the machine and planting in forward and return direction, the rope passing then over the other set of wheels.

I do not claim operating the seed-slide of a check-row corn-planter by means of a knotted cord stretched across the field and passing around pulleys or wheels fixed on the frame of the machine; nor do I claim a seed-box or slide having a slotted throat or conductor-plate fitted therein.

Having thus described my invention, what I claim as new is—

1. The combination, with knotted check-cord passing around wheel or pulley, of the supporting-piece E, having double wheels and pivoted end-slotted arms F, the guide-flanges F', and the lever $n$, connected by pivot-rods $m$ to the arms F, as and for the purpose specified.

2. The combination of the seed-dropping device with a conductor-plate fitted into the seed-box, and provided with feed-slot having sharp edges to cut up lumps, substantially as set forth.

HENRY ARSALOU.

Witnesses:
JOSEPH BARSELOU,
CHARLIE SENECHALL.